(12) United States Patent
Erhard et al.

(10) Patent No.: US 6,891,874 B2
(45) Date of Patent: May 10, 2005

(54) LASER AMPLIFIER SYSTEM

(75) Inventors: Steffen Erhard, Gaeufelden (DE);
Adolf Giesen, Renningen (DE);
Christian Stewen, Winnenden (DE)

(73) Assignee: Universitaet Stuttgart Institut fuer Strahlwerkzeuge, Stuttgart (DE)

( * ) Notice: Subject to any disclaimer, the term of this patent is extended or adjusted under 35 U.S.C. 154(b) by 158 days.

(21) Appl. No.: 10/208,664

(22) Filed: Jul. 29, 2002

(65) Prior Publication Data

US 2003/0025987 A1 Feb. 6, 2003

Related U.S. Application Data

(63) Continuation of application No. PCT/EP01/01129, filed on Feb. 2, 2001.

(30) Foreign Application Priority Data

Feb. 5, 2000 (DE) .......................................... 100 05 195

(51) Int. Cl.$^7$ ................................................. H01S 3/03
(52) U.S. Cl. ............................ 372/64; 372/69; 372/70; 372/92; 372/99
(58) Field of Search ............................ 372/64, 69, 70, 372/92, 99

(56) References Cited

U.S. PATENT DOCUMENTS

| | | | | |
|---|---|---|---|---|
| 4,025,172 A | * | 5/1977 | Freiberg | ..................... 359/859 |
| 5,546,222 A | * | 8/1996 | Plaessmann et al. | ........ 359/346 |
| 6,438,152 B2 | * | 8/2002 | Contag et al. | ................ 372/70 |
| 6,577,666 B2 | * | 6/2003 | Erhard et al. | .................. 372/70 |
| 2001/0040909 A1 | | 11/2001 | Erhard et al. | |
| 2003/0026315 A1 | * | 2/2003 | Erhard et al. | .................. 372/92 |

FOREIGN PATENT DOCUMENTS

| | | |
|---|---|---|
| DE | 40 08 225 | 9/1991 |
| DE | 198 35 107 | 2/2000 |
| EP | 0 632 551 | 1/1995 |

OTHER PUBLICATIONS

Giesen, et al., "Der Scheibenlaser mit neuem Pumpdesign Erste Ergebnisse. The thin disk laser with a new pump design First Results", WLT, XP–00917488, 1999, pp. 36–39.

* cited by examiner

Primary Examiner—Paul Ip
Assistant Examiner—Delma R. Flores Ruiz
(74) Attorney, Agent, or Firm—Barry R. Lipsitz; Douglas M. McAllister

(57) ABSTRACT

The invention relates to a laser amplifier system consisting of a solid body, which comprises a laser-active medium, of a pumping radiation source for generating a pumping radiation field, which repeatedly permeates the solid body, and of a focusing system. Said focusing system generates a number of different branches of the pumping radiation field that enter the solid body and converts at least one branch emerging from the solid body into one of the branches which enter the solid body and which are different from the emerging branch. The aim of the invention is to improve a laser amplifier system of the aforementioned type in order to be able to generate the highest possible pumping power density in the solid body while requiring the smallest possible amount of complexity. To this end, the focusing system comprises at least one deviating unit which converts, by deviating the radiation field with regard to a single plane of symmetry, at least two first partial branches formed from at least two different branches of the pumping radiation field emerging from the solid into at least two corresponding second partial branches which locally extend in a manner that is separate from the first partial branches and of which at least two branches entering the solid body are formed.

32 Claims, 9 Drawing Sheets

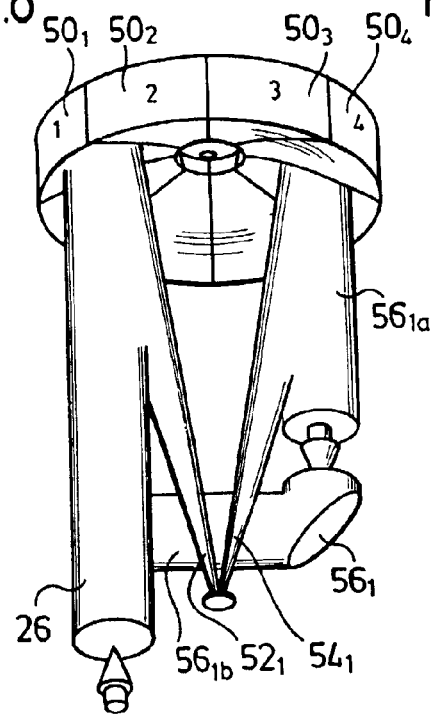
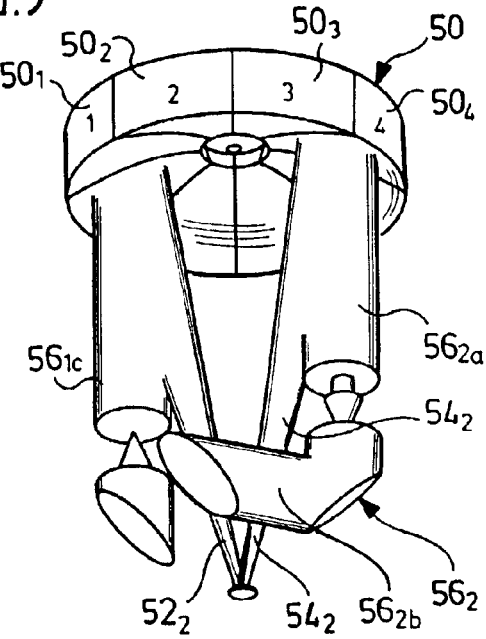
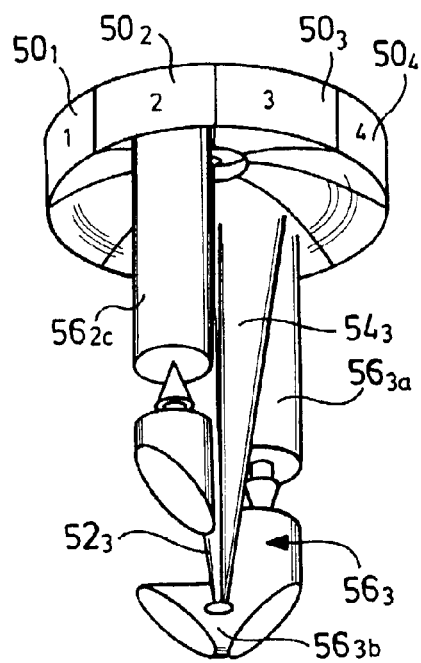
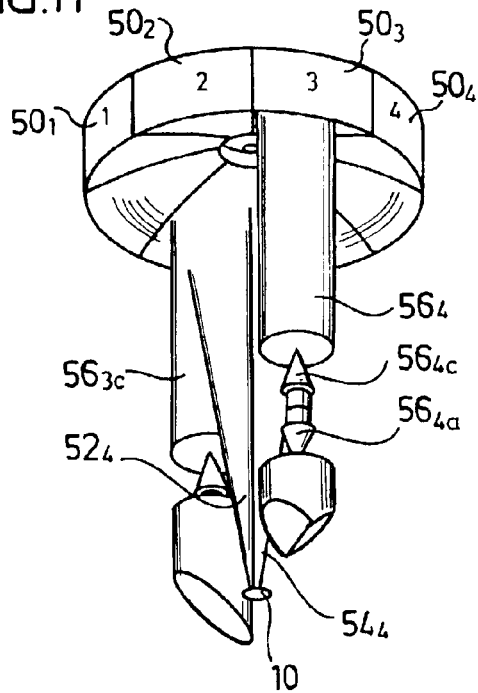

US 6,891,874 B2

LASER AMPLIFIER SYSTEM

This application is a continuation of international application number PCT/EP01/01129 filed on Feb. 2, 2001, which claims priority of German patent application no. 100 05 195 filed on Feb. 5, 2000.

The present disclosure relates to the subject matter disclosed in PCT application No. PCT/EP01/01129 of Feb. 2, 2001, which is incorporated herein by reference in its entirety and for all purposes.

BACKGROUND OF THE INVENTION

The invention relates to a laser amplifier system comprising a solid body having a laser-active medium, a pump radiation source for producing a pump radiation field which passes multiply through the solid body, and a focusing system which produces a plurality of different branches of the pump radiation field that enter the solid body, and in this case converts at least one branch that emerges from the solid body into one of the branches that enter the solid body and are different from the emerging branch.

Such a laser amplifier system is known from the prior art, for example from EP 0 632 551.

In these laser amplifier systems, the branch that emerges from the solid body is merely deviated and refocused onto the solid body.

The disadvantage of such a focusing system is that, with it, the cross section of the pump radiation field to be focused is always increased or significant losses arise because a part of the pump radiation field is not refocused back onto the solid body.

Overall, achieving the highest possible pump power radiation density in the solid body is problematic, especially under the premise that the greatest possible number of passes of the pump radiation field is striven for, since the absorption by the laser-active medium in the body during a single pass of the pump power is small.

It is therefore an object of the invention to improve a laser amplifier system of the generic type in such a way that the highest possible pump power density in the solid body can be achieved with the least possible outlay.

SUMMARY OF THE INVENTION

This object is achieved according to the invention, in the case of a laser amplifier system of the type described in the introduction, by the fact that the focusing system comprises at least one deviating unit which, by radiation field deviation relative to a single symmetry plane, converts at least two first sub-branches, formed from at least two different branches of the pump radiation field that emerge from the solid body, into at least two corresponding second sub-branches with trajectories locally separate from the first sub-branches, from which at least two branches that enter the solid body are obtained.

The advantage of the solution according to the invention is that it provides a straightforward way, with a deviating unit which deviates relative to a single symmetry plane, of in turn producing two different branches that enter the solid body from at least two different emerging branches of the pump radiation field.

As an alternative or supplement to this, a further laser amplifier system according to the invention, which likewise achieves the object stated in the introduction, provides for the focusing system to comprise two deviating units, for each of the deviating units to convert at least one first sub-branch, formed from an emerging branch, into a second sub-branch with a trajectory locally different from the latter, and for each of the deviating units to produce a second sub-branch, from which one of the incident branches is obtained which, for its part, in turn leads to an emerging branch from which a first sub-branch that strikes the other deviating unit is obtained.

The advantage of this solution according to the invention that is it provides a straightforward way of producing a large number of different focused branches that enter the solid body.

In an alternative or supplementary embodiment of the solution according to the invention, provision is made for the focusing system to comprise a first deviating unit and a second deviating unit, and for the two deviating units, respectively by radiation field deviation relative to a single symmetry plane, to convert overall at least three first sub-branches, formed from at least three different emerging branches of the pump radiation field, into at least three corresponding second sub-branches with trajectories locally separate from the first sub-branches, from which at least three incident branches are obtained.

The advantage of this solution is likewise that it provides an extremely straightforward way of producing as many incident branches as possible.

As an alternative and/or supplement to the solutions according to the invention described above, provision is made in a particularly preferred embodiment for the focusing system to have at least one deviating unit, and for the deviating unit to form, from one of the first sub-branches, a second sub-branch which is offset in relation to the mid-axis of the focusing system by an angular spacing such that at least one further first sub-branch lies in the angle range between this first sub-branch and the second sub-branch formed therefrom.

This solution also has the advantage that it provides a particularly straightforward way of producing as large as possible a number of incident branches that are focused onto the solid body.

As an alternative and/or supplement to the solutions described above, provision is made in a further preferred embodiment for the focusing system to have a first deviating unit, which deviates the pump radiation field relative to a first deviating symmetry plane, and to have a second deviating unit, which deviates the pump radiation field relative to a second deviating symmetry plane, and for the symmetry planes to meet at an angle which corresponds to 180° or 360° divided by the sum of the incident and emerging branches arising during a pass of the pump radiation field through the focusing system and the solid body.

The term "pass of the pump radiation field through the focusing optics" means that the pump radiation field propagates, with one propagation direction, through the focusing optics and strikes the respective optical elements once.

In terms of the orientation of the symmetry plane of the deviating units, no detailed indications have been given so far. For instance, in order to obtain beam guiding conditions that are as simple as possible, it is advantageous for the symmetry planes to run parallel to the mid-axis.

It is particularly favorable, for the arrangement of the individual sub-branches and branches, for the symmetry planes to run through the mid-axis.

In terms of the arrangement of the first sub-branches in the pump radiation field, no detailed indications have been given so far. It is particularly favorable in this case for the first sub-branches to have separate trajectories from one another in the pump radiation field, that is to say they at most touch, and preferably have a small spacing from one another.

It is particularly favorable in this case for the first sub-branches to be arranged relative to one another at angular spacings around a mid-axis of the focusing system.

It is also advantageous, in terms of the second sub-branches, for them to have separate trajectories from one another.

It is particularly favorable in this case for the second sub-branches to have separate trajectories from the first sub-branches as well.

A particularly favorable solution provides for the second sub-branches to be arranged relative to one another, and relative to the first sub-branches, at angular spacings around the mid-axis of the focusing system.

In this case, the angular spacings may be small, although it is advantageous for there to be at least a small angular spacing so that the sub-branches can respectively be arranged separately from one another.

In particular, in all embodiments of the solution according to the invention in which at least three first sub-branches and at least three second sub-branches arise, provision is made for the at least three first sub-branches and the at least three second sub-branches to arise during a pass of the pump radiation field through the focusing system and the solid body, the term "pass through the focusing system" being intended to mean that the pump radiation field propagates in one direction through the focusing system and in this case forms the various branches and sub-branches.

A particularly advantageous arrangement of the first and second sub-branches provides for the first and second sub-branches arising during a pass of the pump radiation field through the branch focusing system to be arranged without overlap in the space around the mid-axis of the focusing system.

It is particularly advantageous, especially in terms of the pump radiation branch that is furthermore required, for the first and second sub-branches as well as the pump radiation branch of a pass to be arranged without overlap in the space around the mid-axis of the focusing system.

A particularly favorable type of arrangement of the first and second sub-branches provides for the first and second sub-branches to be respectively arranged in space segments around the mid-axis of the focusing system, and for them to extend inside the space segments transversely with respect to their propagation direction, but not to reach beyond the space segments allocated to them.

A particularly advantageous distribution can be obtained when each of the space segments stretches over approximately the same angle range around the mid-axis.

A particularly uniform distribution of the focused branches that enter the solid body can be obtained when the space segments of the first and second sub-branches, as well as the space segment of the pump radiation branch, substantially enclose the mid-axis.

In terms of the specifics of the design of the focusing system, no detailed indications have been given in connection with the explanation of the individual exemplary embodiments so far. For instance, an advantageous solution provides for the focusing system to convert a branch that emerges from the solid body into an intermediate-collimated branch, and for it to convert the intermediate-collimated branch in turn into a branch that again enters the solid body and is focused onto it. This solution has the great advantage that precise imaging conditions can thereby be obtained and, in particular, the beam cross section does not experience any broadening in the course of the refocusing.

In principle, the deviating units may be arranged in such a way that they act on each of the branches. It is particularly favorable for the intermediate-collimated branches to form the first and second sub-branches, which enter or depart from the deviating units, so that the deviation takes place in the vicinity of the collimated branches.

In terms of the course of the first and second sub-branches, no detailed indications have been given in connection with the explanation of the individual exemplary embodiments so far.

For instance, particularly advantageous optical imaging conditions can be achieved when the first and second sub-branches run parallel to one another. It is even more favorable for the first and second sub-branches to run parallel to the mid-axis, since then the collimating and focusing elements can also be orientated in the same way relative to the mid-axis.

A solution that is particularly advantageous in terms of the geometrical proportions in this case provides for the first and second sub-branches to be arranged at approximately the same radial spacing around the mid-axis. In this case, the focusing and collimating elements can be arranged particularly favorably relative to the mid-axis, in order to achieve imaging conditions that are as standardized as possible.

The indications above in terms of the first and second sub-branches advantageously also apply to the pump radiation branch, so that the latter is also advantageously oriented parallel to the first and second sub-branches and, even more advantageously, also parallel to the mid-axis.

It is particularly advantageous if the pump radiation branch already runs at approximately the same radial spacing from the mid-axis as the first and second sub-branches as well.

In terms of the structure of the focusing system, a very wide variety of solutions are conceivable. For example, the focusing and deviation may be carried out with the same elements. It is particularly favorable, however, for the focusing system to have collimating and focusing elements, which convert the incident branches into intermediate-collimated branches and the intermediate-collimated branches into incident branches, respectively.

Such collimating and focusing elements may be provided as individual elements for each deviation of an emerging branch into an intermediate-collimated branch, or of each intermediate-collimated branch into an incident focused branch. It is particularly favorable for all the collimating and focusing elements to be designed identically.

In terms of the design of the collimating elements, no detailed indications have been given so far. For instance, it would be conceivable to use lenses as the collimating and focusing elements.

A particularly favorable structure can be achieved when the collimating and focusing elements are formed by concave mirrors.

Such concave mirrors may, for example, be mirrors that are parabolic in cross section or are shaped as a circle arc in cross section.

For instance, the mirrors may in principle be designed in such a way that they produce a line focus. It is even better for the concave mirrors to be designed in such a way that they produce a substantially point-like focus.

In the simplest case, the collimating and focusing elements are designed in such a way that they are segments of a rotationally symmetrical mirror, the mirror preferably being arranged rotationally symmetrically with respect to the mid-axis of the focusing system.

It is even more favorable, however, for the collimating and focusing elements to be segments of a continuous rotationally symmetric concave mirror.

In terms of the arrangement of the deviating units relative to the collimating and focusing elements, provision is preferably made for the deviating units to be arranged in such a way relative to the collimating and focusing elements that they deviate the intermediate-collimated branches from a collimating element onto a focusing element.

In terms of the branch of the pump radiation field arising after a pass through the focusing system, no detailed indications have been given so far. For instance, it would be conceivable simply to leave unused the last branch that emerges from the solid body.

It is particularly advantageous, however, for a collimated branch to be formed after a pass of the pump radiation field through the focusing system, since such a collimated branch can still be used further with the power that is still available.

A favorable solution provides for the collimated first sub-branch formed after a pass through the focusing system to be converted into a second sub-branch that is substantially congruent with the first sub-branch.

Such conversion of a first sub-branch into a substantially congruent second sub-branch may optionally be carried out by obtaining the second sub-branch that is substantially congruent with the first sub-branch by back-reflection at a plane reflection surface.

As an alternative to this, it is possible according to the invention for the second sub-branch that is substantially congruent with the first sub-branch to occur by reflection at a symmetry-preserving deflecting reflection system, the possibility being available to make the second sub-branch return laterally inverted with respect to the first sub-branch.

A particularly advantageous solution of the laser amplifier system according to the invention provides for the focusing system to have at most two deviating units allocated to the solid body, which convert a first sub-branch, formed from a branch that emerges from the solid body, into a second sub-branch which forms one of the branches that enter this solid body, so that the same solid body is always multiply illuminated by the two deviating units.

The laser amplifier system according to the invention is not, however, restricted to solutions with a single solid body.

An advantageous solution provides for it to comprise at least two solid bodies, and for at least one third deviating unit to be provided which deviates a branch of the pump radiation field transversely with respect to a further symmetry plane stretching between the solid bodies.

The advantage of this solution is that either two independent lasers can thereby be pumped with the same pump radiation field, or the possibility is provided of arranging the two solid bodies in such a way that they are used to amplify one laser radiation field passing through them, so that the pump radiation can be optimally utilized.

In terms of the design of the deviating units used according to the invention, no detailed indications have been given so far. For instance, an advantageous exemplary embodiment provides for the deviating unit to comprise two reflection faces running at an angle to one another. The reflection faces may in this case run at a spacing from one another.

Provision is preferably made, however, for the reflection faces to abut one another along a line.

The reflection faces may in principle be arranged on different supports. A particularly advantageous exemplary embodiment provides for the reflection faces to be arranged on a reflector unit.

Preferably, such a reflector unit constitutes a prism.

In terms of the arrangement of the first and second deviating units, no detailed indications have been given so far. For instance, an advantageous solution provides for the first and second deviating units to form a recess through which the branches that enter or emerge from the solid body pass, so that all the incident and emerging branches run in the direction of the mid-axis of the focusing system and strike the solid body that preferably runs symmetrically with respect to the mid-axis.

In order to be able to route the pump radiation branch furthermore in a straightforward way, provision is preferably made for the deviating units to form a recess through which a pump radiation branch enters the focusing system.

Further features and advantages of the invention are the subject matter of the following description and the graphical representation of several exemplary embodiments.

BRIEF DESCRIPTION OF THE DRAWINGS

FIG. 8 shows a perspective view from behind based on the view in FIG. 3, but without deviating units in order to demonstrate the course of the collimated pump radiation branch, the first focused incident branch, the first defocused emerging branch and the first collimated branch;

FIG. 9 shows a similar view to FIG. 8 in order to demonstrate the course of the second focused incident branch, the second defocused emerging branch and the second collimated branch;

FIG. 10 shows a similar view to FIG. 8 in order to demonstrate the third focused incident branch, the third defocused emerging branch and the third collimated branch;

FIG. 11 shows a similar view to FIG. 8 in order to demonstrate the course of the fourth focused incident branch, the fourth defocused emerging branch and the fourth collimated branch;

DETAILED DESCRIPTION OF THE INVENTION

Figure 1:
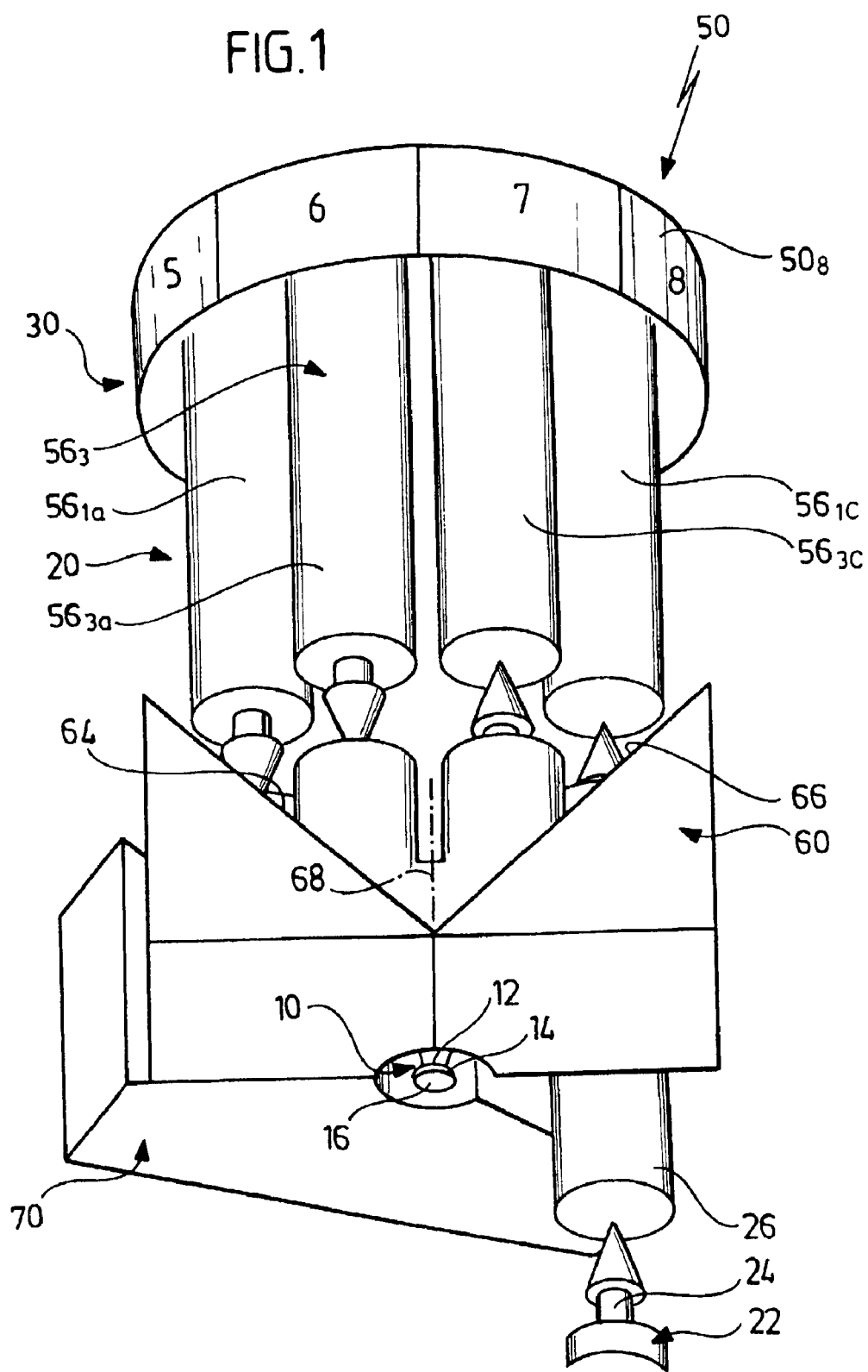
FIG. 1 shows a perspective view of a first exemplary embodiment of a laser amplifier system according to the invention from the lower front.

A first exemplary embodiment of a laser amplifier system according to the invention, represented in FIGS. 1 to 12, comprises a disk-shaped solid body 10 having a laser-active medium, which has a frontal flat side 12 and a rear flat side 14 that may be either plane or curved, and which rests via its rear flat side 14 on a reflector 16. Preferably, the reflector 16 is in this case applied to the rear flat side 14 as a layer.

Furthermore, the solid body 10 is preferably cooled via the reflector 16, and hence the rear flat side 14, such cooling being implementable, in particular, by using a cold finger on which the reflector 16 rests with thermal contact.

A pump radiation field, denoted as a whole by 20, which is defined by a focusing system, denoted as a whole by 30, and the reflector 16, is injected into the solid body 10 via the frontal flat side 12, and in this case passes multiply through the solid body 10, so that the laser-active medium in the solid body 10 can be excited by the pump radiation field 20 upon each pass through the solid body 10.

The laser-active medium in the solid body 10 produces a laser radiation field 40 which, for example, is likewise reflected by the reflector 16, emerges through the frontal flat side 12 of the solid body 10 and propagates in the direction of a mid-axis 42 of the laser amplifier system, for example with separate optics being provided for the laser radiation field 40, for example a resonator or optics that multiply reflect the laser radiation field 40, so that the laser radiation field 40 likewise passes multiply through the solid body 10.

Such a laser amplifier system is, for example, described from basic principles in EP 0 632 551, to which comprehensive reference is made in terms of the operating procedure of the laser amplifier system, the arrangement of the solid body 10 and the reflector 16, as well as the cooling thereof.

A pump radiation source 22 provided in order to generate the pump radiation field 20 is, for example, a laser, preferably a semiconductor laser, whose laser radiation 24 is routed via a beam guiding system, for example an imaging system or a fiber optic system, to the laser amplifier system according to the invention with the formation of a collimated pump radiation branch 26, which passes through a first space segment $32_1$ of the focusing system 30 and strikes a focusing element, for example a first segment $50_1$ of a parabolic mirror, denoted as a whole by 50, which is part of the focusing system 30.

By the segment $50_1$ of the parabolic mirror 50, a third incident branch $52_1$ is formed from the pump radiation branch 26 and is focused onto the solid body 10, enters it through the frontal flat side 12, passes through the solid body 10 and is reflected back by the reflector 16, so as to obtain a first emerging branch $54_1$ which propagates as a defocused branch in the direction of the parabolic mirror 50 and strikes a collimating element, for example a fifth segment $50_5$ of the parabolic mirror 50. From the first emerging branch $54_1$, this fifth segment $50_5$ forms a first collimated branch $56_1$ of the pump radiation field 20 which, starting from the fifth segment $50_5$ of the parabolic mirror 50 and in the form of a first sub-branch $56_{1a}$ propagating parallel to the mid-axis 42 in a fifth space segment $32_5$ (FIG. 12), propagates starting from the parabolic mirror 50 in the direction of a first deviating unit 60 which is formed, for example, by a prism 62 that comprises two reflector faces 64 and 66, which meet at an angle of 90° and are arranged symmetrically with respect to a symmetry plane 68 that runs parallel to the mid-axis 42 and through it.

The first sub-branch $56_{1a}$ of the collimated branch $56_1$, which runs in the space segment $32_5$, in this case strikes the reflector face 64 which forms by reflection the deviated branch $56_{1b}$ of the collimated branch $56_1$, which for its part, by reflection at the reflector face 66, is in turn reflected parallel to the sub-branch $56_{1a}$, but at a spacing therefrom, in the direction of the parabolic mirror 50 and propagates in the direction of the parabolic mirror 50 in the form of a second sub-branch $56_{1c}$ in an eighth space segment $32_8$ and finally strikes the focusing element, for example the eighth segment $50_8$ of the parabolic mirror 50, so that overall the sub-branches $56_{1a}$ and $56_{1c}$ run at an angular spacing from one another in relation to the mid-axis 42 in the collimated branch $56_1$, and deviation of the collimated branch $56_1$ from the fifth space segment $32_5$ to the eighth space segment $32_8$ therefore takes place overall.

From the branch $56_{1c}$ of the collimated branch $56_1$, the eighth segment $50_8$ of the mirror 50 forms a second incident and focused branch $52_2$ which, for its part, in turn strikes the solid body 10, passes through it and is reflected by the reflector 16, so that a second emerging defocused branch $54_2$ is obtained, which strikes a further collimating element, for example the segment $50_4$ of the parabolic mirror 50, which forms, from the emerging branch $54_2$, a second collimated branch $56_2$ that propagates with its sub-branch $56_{2a}$ in a fourth space segment $32_4$ (FIG. 12) in the direction of a second deviating unit 70 (represented in particular in FIG. 3) which is likewise formed as a prism 72 and has reflector faces 74 and 76 which meet at an angle of 90° and are arranged symmetrically with respect to a symmetry plane 78 that runs parallel to the mid-axis 42 and through it. The symmetry plane 78 however, as represented in FIG. 12, is arranged in relation to the symmetry plane 68 at an angle α which is equal to 22.5°.

The deviating unit 70 therefore causes deviation of the second collimated branch $56_2$ via the deviated sub-branch $56_{2b}$ symmetrically with respect to the symmetry plane 78, so that the reflection faces 74 and 76 produce a second sub-branch $56_{2c}$ which runs parallel to the sub-branch $56_{2a}$ in a second space segment $32_2$, strikes a focusing element in the form of the second segment $50_2$ of the parabolic mirror and is therefore likewise arranged offset in relation to the sub-branch $56_{2a}$ by an angular spacing with respect to the mid-axis 42. The second segment $50_2$ forms, from the sub-branch $56_{2c}$ of the collimated branch $56_2$, the third incident branch $52_3$ that is focused onto the solid body 10, which passes through the solid body 10 and is reflected at the reflector 16, so that the third emerging branch $54_3$ is obtained which strikes the sixth segment $50_6$, which constitutes a collimating element, of the parabolic mirror denoted as a whole by 50, and this forms the third collimated branch $56_3$ which, for its part, in turn propagates with the first sub-branch $56_{3a}$ in a sixth space segment $32_6$ (FIG. 12) in turn in the direction of the deviating unit 60, so that by using the reflection faces 64 and 66, via the formation of the deviated sub-branch $56_{3b}$, the second sub-branch $56_{3c}$ is obtained which propagates in a seventh space segment $32_7$ (FIG. 12) in the direction of the parabolic mirror 50 and strikes the segment $50_7$ thereof that constitutes a focusing element, with the sub-branches $56_{3a}$ and $56_{3c}$ in turn propagating parallel to one another and parallel to the mid-axis 42.

Figure 2:
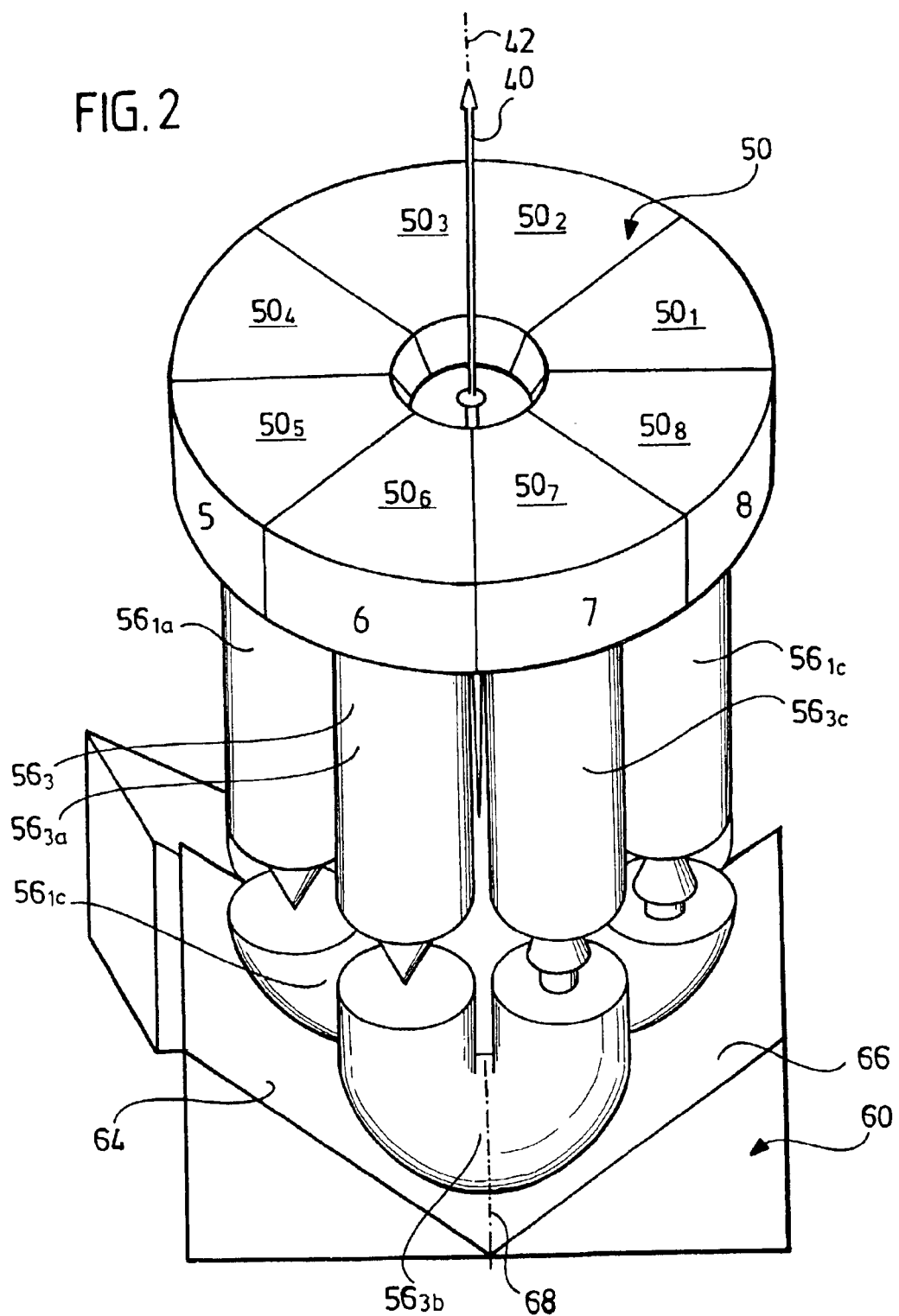
FIG. 2 shows a perspective view of the laser amplifier system according to the invention from the upper front.
Figure 3:
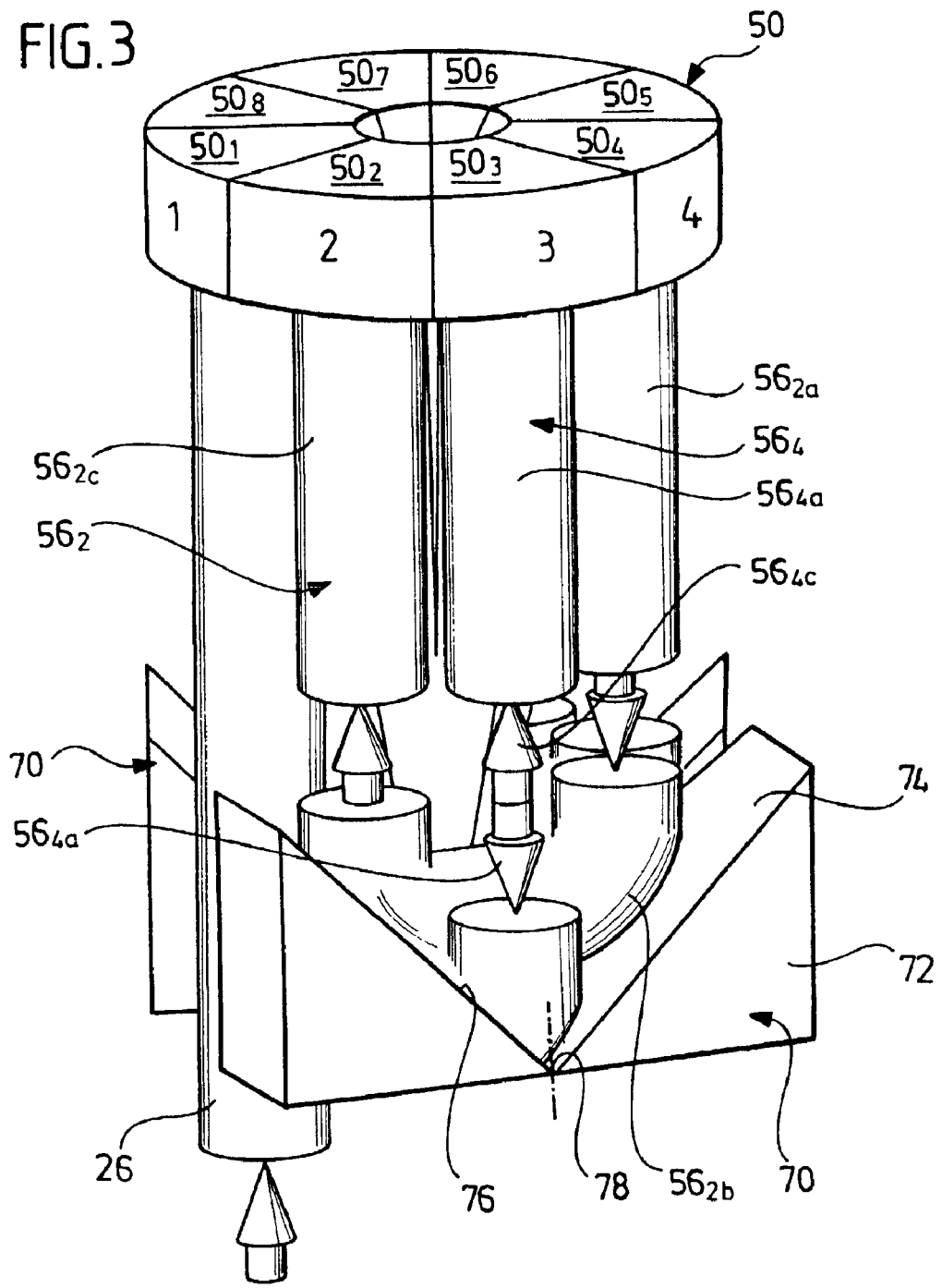
FIG. 3 shows a perspective view of a laser amplifier system according to the invention from behind.
Figure 4:
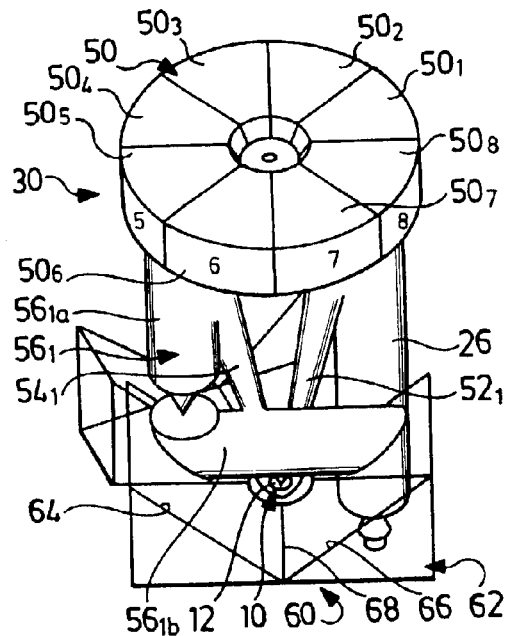
FIG. 4 shows a similar sub-view to FIG. 2 in order to demonstrate the first focused incident branch, the first defocused emerging branch and the first collimated branch.
Figure 5:
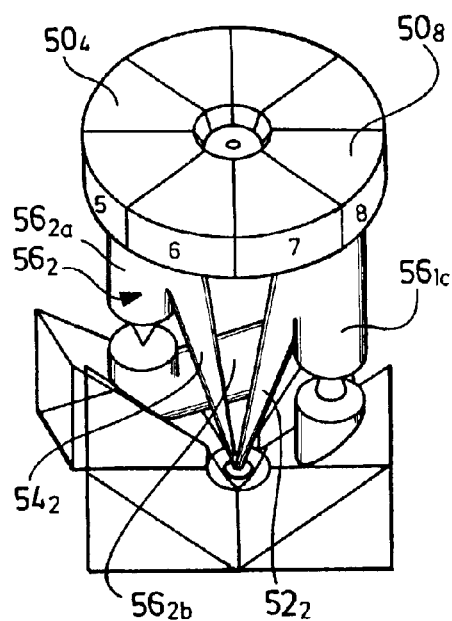
FIG. 5 shows a similar view to FIG. 2 in order to demonstrate the second focused incident branch and the second defocused emerging branch as well as the second collimated branch.
Figure 6:
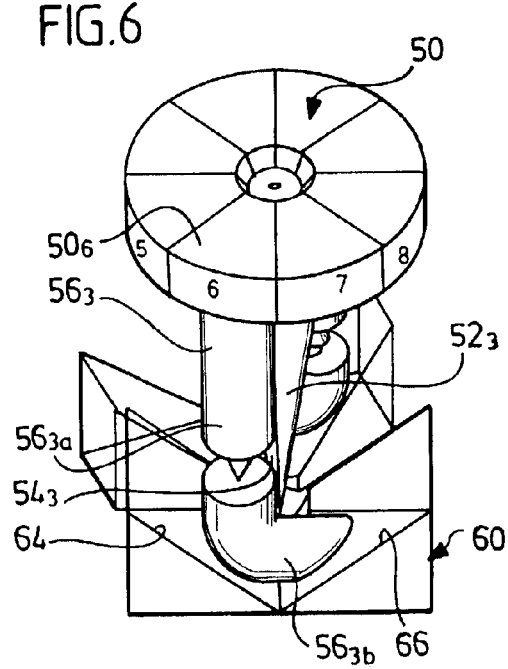
FIG. 6 shows a similar view to FIG. 2 in order to demonstrate the third focused branch, the third focused incident branch, the third defocused emerging branch and the third collimated branch.
Figure 7:
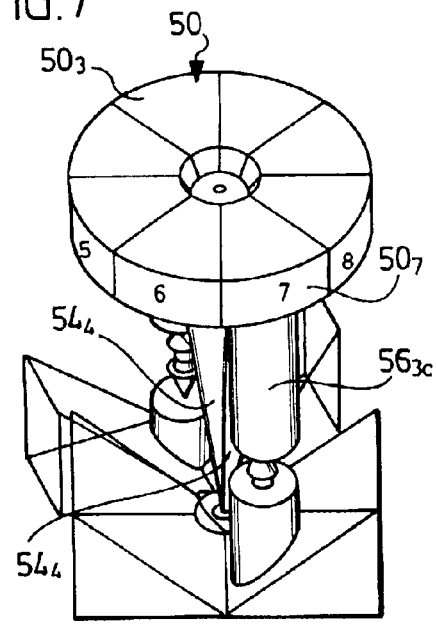
FIG. 7 shows a similar view to FIG. 2 in order to demonstrate the fourth focused incident branch, the fourth defocused emerging branch and the fourth collimated branch.

The third collimated branch $56_3$ in this case runs, as represented in FIGS. 1 and 2, in such a way that all the sub-branches $56_{3a}$, $56_{3b}$ and $56_{3c}$ lie in an angle range that covers the space segments $32_7$ and $32_7$ between the sub-branches $56_{1a}$ and $56_{1c}$ of the first collimated branch, so that the first collimated branch $56_1$ and the third collimated branch $56_3$, although they are both deviated by the deviating unit 60, do not overlap but both experience a deviation symmetrically with respect to the symmetry plane 68.

Figure 12:
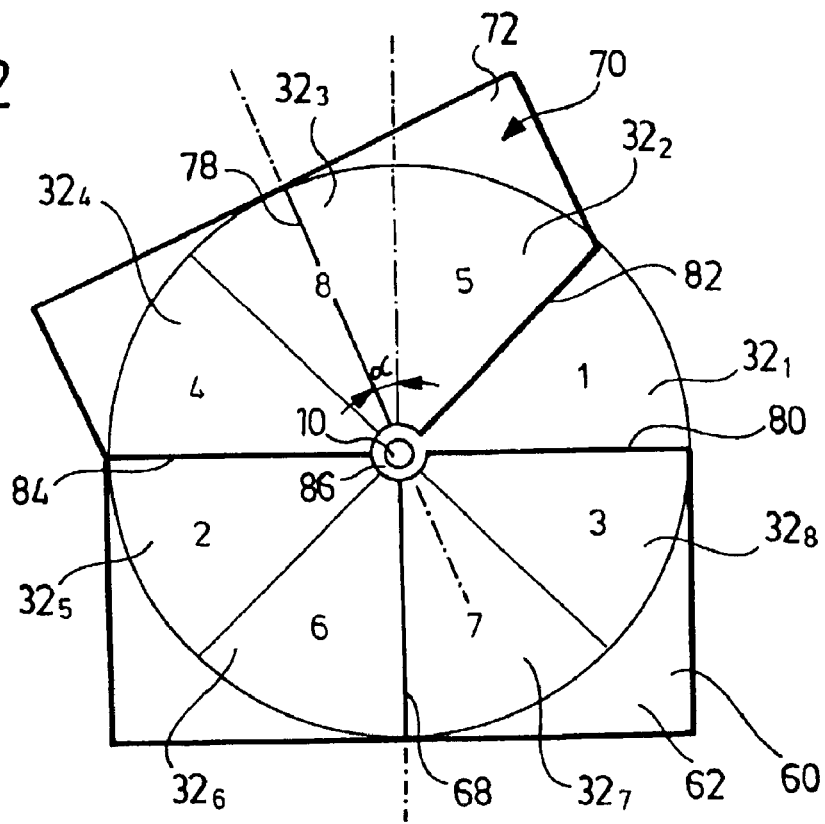
FIG. 12 shows a schematic plan view of the deviating units of the first exemplary embodiment together with a representation of space segments in which the collimated branches run.

By using the segment $50_7$ of the parabolic mirror 50, the formation of a fourth incident branch $52_4$ takes place, which strikes the solid body 10 and is reflected by the reflector 16, so that the fourth emerging branch $54_4$ is obtained which strikes a third segment $50_3$ that constitutes a collimating element of the parabolic mirror 50, which produces the fourth collimated branch $56_4$ in a third space segment $32_3$ (FIG. 12). This concludes a pass of the pump radiation field 20 through the refocusing optics 30 and the solid body 10.

Owing to fact that the fourth collimated branch $56_4$ runs symmetrically with respect to the symmetry plane 78, it can be reflected back on itself in relation to the overall collimated branch, although since half of the fourth collimated branch $56_4$ with its first sub-branch $56_{1a}$ strikes the reflection face 74 and half of it strikes the reflection face 76, the returning sub-branch $56_{4c}$ runs laterally inverted in relation to the first sub-branch $56_{4a}$ with respect to the symmetry plane 78.

Furthermore, the production of the returning second sub-branch $56_{4c}$ presupposes that the reflection faces 74 and 76 abut one another, specifically along a contact line running in the symmetry plane 78.

This returning sub-branch $56_{4c}$ provides the opportunity to make the pump radiation field 20 pass again through the refocusing optics 30 and through the solid body 10 via a further pass, with the path of the pump radiation field being inverted and with the four emerging defocused branches $54_1$ to $54_4$ becoming incident focused branches and the incident focused branches $52_1$ to $52_4$ becoming emerging defocused branches.

This provides the opportunity, in the first exemplary embodiment, to make the pump radiation field 20 pass overall 16 times through the solid body 10, namely since the four incident branches $52_1$ to $52_4$ of the first pass and the four emerging branches $54_1$ to $54_4$ of the first branch give rise to eight transmissions and the second pass likewise gives rise to eight transmissions.

FIG. 12 represents the sequence of passing through the individual space segments $32_1$ to $32_8$ by the numbers 1 to 8 in the individual space segments 32, that is to say that the pump branch 26 strikes the space segment $32_1$ then, after formation of the first incident focused branch $52_1$ and the first emerging defocused branch $54_1$, the formation of the branch $56_1$ takes place which runs initially in the space segment $32_5$ and then, after deviation by the first deviating unit 60, in the space segment $32_8$, and so on, until finally the fourth collimated branch $56_4$ strikes the second deviating unit 70 symmetrically with respect to the symmetry plane 78 and is reflected back on itself, although laterally inverted.

Preferably, as clearly represented in particular by FIG. 12, the first deviating unit 60 and the second deviating unit 70 in the first exemplary embodiment are designed in such a way that, between them, a section 80 is left which corresponds to the angular extent of the first space segment $32_1$, so that the collimated pump radiation branch 26 can be guided through this section 80 to the parabolic mirror 50.

Preferably, the two deviating units 60 and 70 are designed in such a way that they have a shape which is symmetrical with respect to the symmetry plane 68 or 78, respectively, in the simplest case the deviating unit 60 being formed by a prism 62 with a rectangular base face and the deviating unit 70 being formed by a prism 72 with side edges 82 and 84 running at an angle symmetrically with respect to the symmetry plane 78, this angle between the side edges 82 and 84 being equal to 135° in the first exemplary embodiment. The two deviating units 60, 70 furthermore form a recess 86 through which the branches 52 and 54 of the pump radiation field that lead to the solid body 10 can pass, and which can also accommodate the solid body 10.

In the solution according to the invention, it is assumed that the collimated pump radiation branch 26 and the collimated sub-branches $56_{1c}$ to $56_{3c}$ that form the other incident branches $52_2$ to $52_4$, as well as the collimated sub-branches $54_{1a}$ to $54_{4a}$ formed from the emerging branches $54_1$ to $54_4$, do not overlap. For this reason, a separate space segment $32_1$ to $32_8$ is respectively to be provided for each of these collimated branches 26, $54_{1c}$ to $54_{3c}$ as well as $54_{1a}$ to $54_{4a}$, so that the number and extent of the space segments $32_1$ to $32_8$ corresponds to the number and extent of the segments $50_1$ to $50_8$ of the parabolic mirror 50, and also to the number of the aforementioned collimated sub-branches, with the space segments 32 respectively stretching over the same angular spacing around the mid-axis 42, since a cross-sectional area of the collimated branches 56 of the resonator radiation field 20 also does not change during the pass through the refocusing optics 30.

Figure 13:
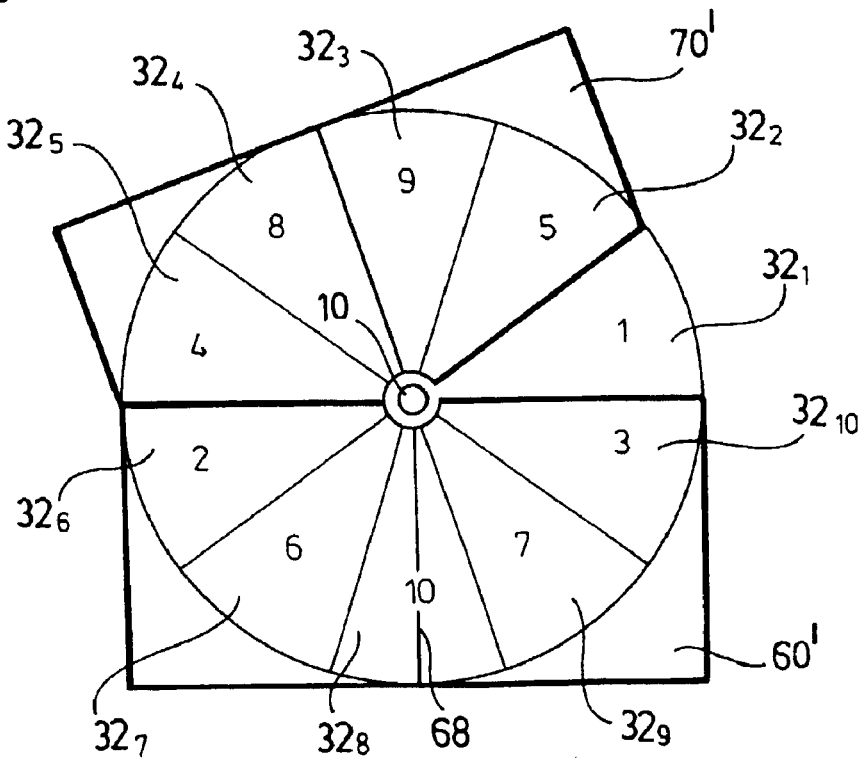
FIG. 13 shows a similar representation to FIG. 12 in the case of a second exemplary embodiment.

If the angle over which the respective space segments 32 stretch is reduced, then as represented in a second exemplary embodiment in FIG. 13, the number of pump transmissions through the solid body 10 is likewise greater. In this case, the second deviating unit 70' is designed and arranged in such a way that it deviates the second collimated branches, and the first deviating unit 60' is arranged in such a way that it deviates two collimated branches and reflects the last collimated branch however laterally inverted back on itself, since half of the latter strikes the reflection face 64 and half of it strikes the reflection face 66.

FIG. 13 now indicates, on the one hand, the number of space segments $32_1$ to $32_{10}$ and, furthermore, the sequence of passing through these is indicated in each space segment 32 by the numbers 1 to 10. In the third exemplary embodiment, the fifth collimated branch $56_5$ running in the eighth space segment $32_8$ is hence reflected back on itself by the reflection faces 64 and 66. In the second exemplary embodiment, it is therefore possible to obtain 20 pump transmissions through the solid body 10, in contrast to the 16 pump transmissions of the first exemplary embodiment.

Figure 14:
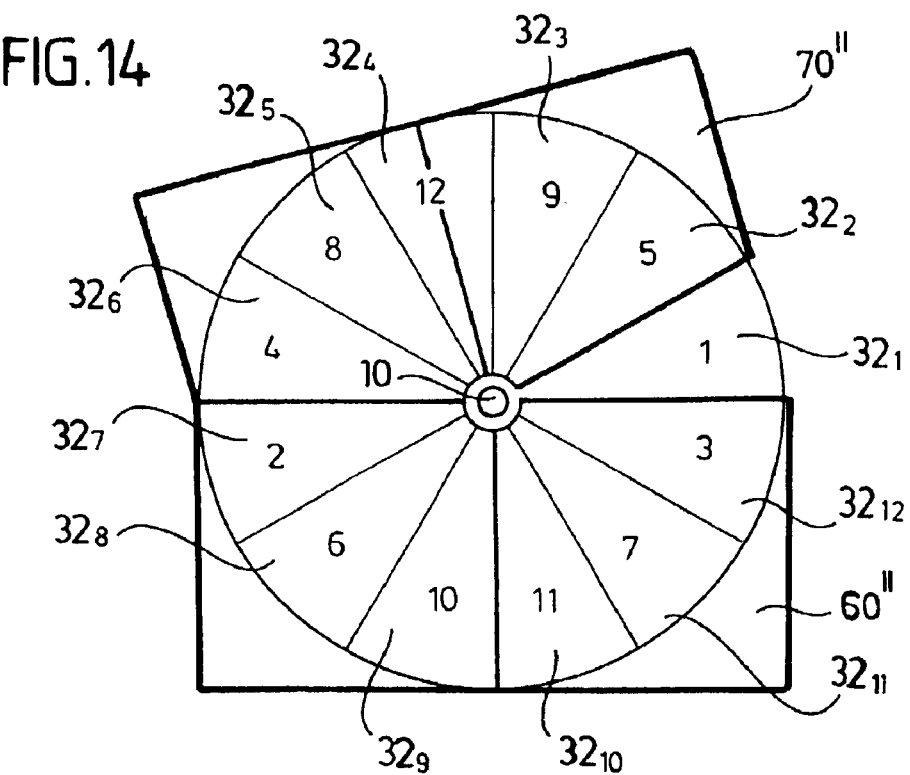
FIG. 14 shows a similar representation to FIG. 12 in the case of a third exemplary embodiment.
Figure 15:
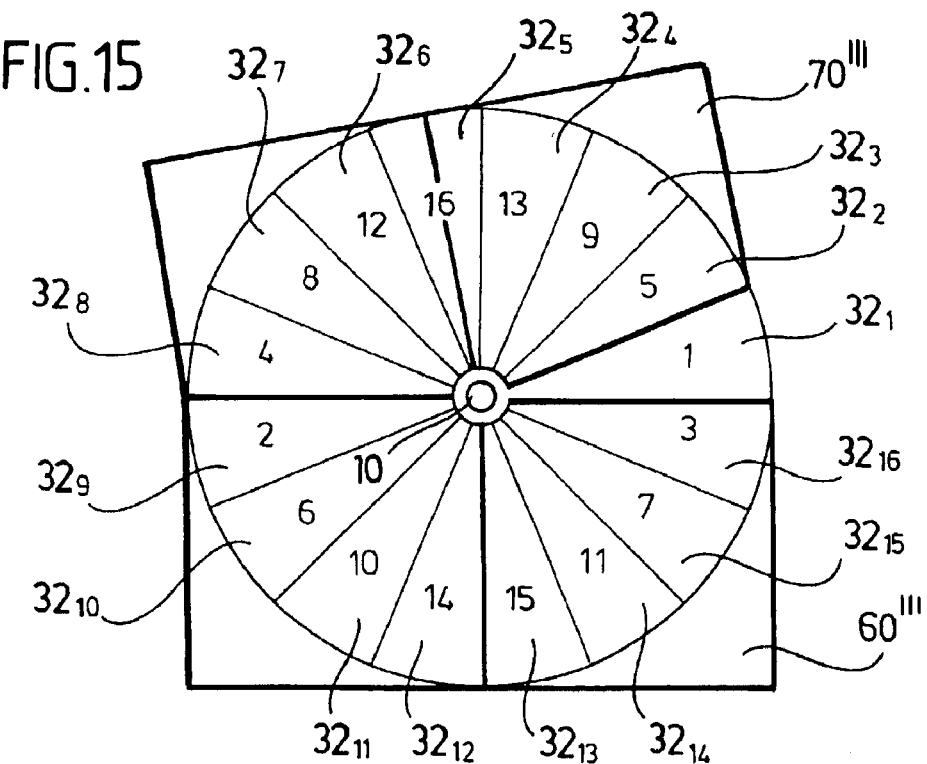
FIG. 15 shows a similar representation to FIG. 12 in the case of a fourth exemplary embodiment.

In a third exemplary embodiment, represented in FIG. 14, the number of pump transmissions is increased further, with the number of space segments 32 likewise being increased correspondingly.

In the third exemplary embodiment, the first deviating unit 60" is designed in such a way that it stretches over six space segments overall, namely the space segments $32_7$ to $32_{12}$, and deviates three collimated branches 56 overall, while the second deviating unit $70''$ is designed in such a way that it deviates two collimated branches overall and additionally reflects one back on itself.

In particular, it can be seen in the third exemplary embodiment that, during the pass through the refocusing optics 30, the collimated branch deviated first in each of the deviating units $60''$ and $70''$, namely the collimated branch stretching from the space segment $32_7$ to the space segment $32_{12}$, has the greatest angular spacing between the first sub-branch $56_{1a}$ and the third sub-branch $56_{1c}$, while the deviated sub-branches following later, namely the collimated branches 56 stretching between the space segments $32_8$ and $32_{11}$, and between the space segment $32_9$ and $32_{10}$, with their first sub-branch and their second sub-branch, respectively lie between the first and second sub-branch of the collimated branch previously deviated by the same deviating unit $60''$.

In a fourth exemplary embodiment, represented in FIG. 14, the number of pump transmissions can be increased to 32 by further increasing the space segments 32 to 16 overall, in which case the first deviating unit $60'''$ deviates four collimated branches overall, while the second deviating unit $70'''$ deviates three collimated branches and reflects one back on itself, although laterally inverted.

Figure 16:
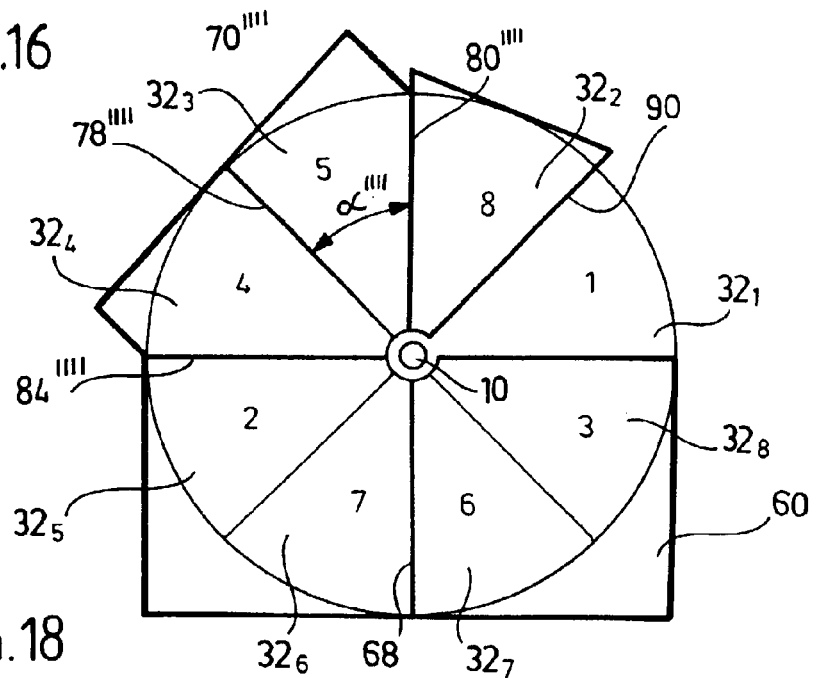
FIG. 16 shows a similar representation to FIG. 12 in the case of a fifth exemplary embodiment.

In a fifth exemplary embodiment, represented in FIG. 16, 16 pump transmissions are provided just as in the first exemplary embodiment, so that the parabolic mirror 50 overall 8 space segments 32 are provided.

In contrast to the first exemplary embodiment, however, the second deviating unit $70''''$ is designed in such a way that it stretches merely over two space segments, namely the space segments $32_3$ and $32_4$, so that the side edges $82''''$ and $84''''$ meet at an angle of $90°$.

The deviating unit 60 in the fifth exemplary embodiment is designed in the same way as in the first exemplary embodiment, and stretches over four space segments $32_5$ to $32_8$.

Because the second deviating unit $70''''$ is restricted to the space segments $32_3$ and $32_4$, the second collimated branch $56_2$ no longer stretches between the space segments $32_2$ to $32_4$, but rather between the space segments $32_3$ and $32_4$, since the symmetry plane $78''''$ meets the symmetry plane 68 at an angle $\alpha''''$ of $45°$.

The fourth collimated branch $56_4$ therefore also lies in the space segment $32_2$ and, in order to reflect it back, the space segment $32_2$ is allocated an end mirror 90 which is formed, for example, as a plane mirror and hence reflects the fourth collimated branch $56_4$ back on itself, but not laterally inverted.

The different shape of the deviating element $70''''$ furthermore has the effect that the third collimated branch does not run from the space segment $32_6$ to the space segment $32_7$, as in the first exemplary embodiment, but rather from the space segment $32_7$ to the space segment $32_6$.

Figure 17:
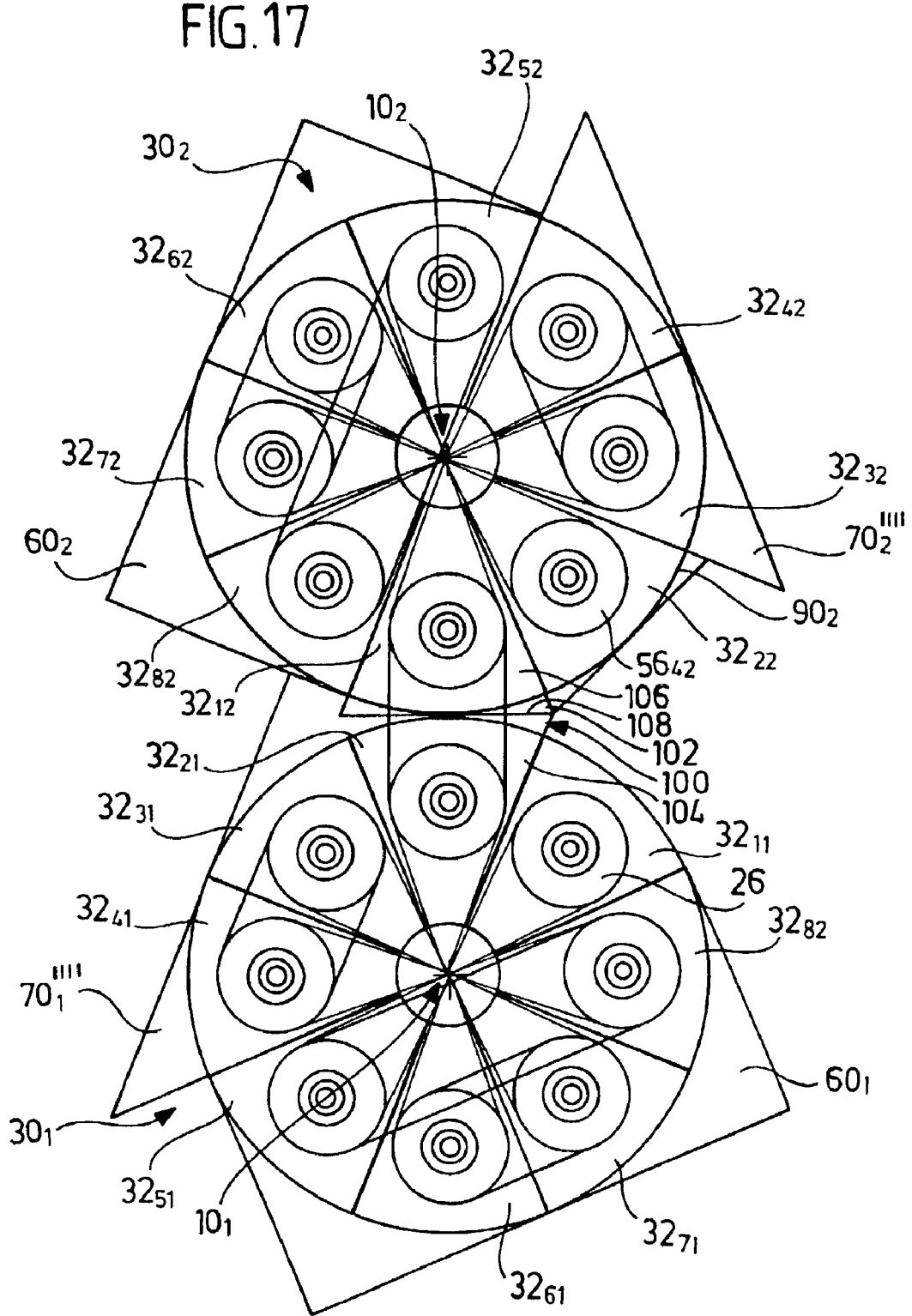
FIG. 17 shows a similar representation to FIG. 12 in the case of a sixth exemplary embodiment.

The fifth exemplary embodiment according to FIG. 16 may then, as in a sixth exemplary embodiment represented in FIG. 17, also be expanded in order to pump two solid bodies $10_1$ and $10_2$, each of the solid bodies 10 being allocated a focusing subsystem $30_1$ and $30_2$ which respectively has, in addition to the parabolic mirror 50 with eight segments, the first deviating unit 60 and the second deviating unit $70''''$.

In contrast to the fifth exemplary embodiment, the end mirror 90 is replaced by a deviating unit 100 which, for example, comprises a deviating prism 102 with a first reflection face 104 and a second reflection face 106, both of which are arranged symmetrically with respect to a symmetry plane 108 that runs between the solid bodies 10 and transversely with respect to a connecting straight line between them.

This deviating unit 100 provides the opportunity to transfer the fourth collimated branch $56_4$ from the first focusing subsystem $30_1$ to the second focusing subsystem $30_2$, and to make it run in the first space segment $32_{11}$ there, like the collimated pump radiation branch 26, in which case, in the same way as already described in connection with the fifth exemplary embodiment and the first exemplary embodiment, the subsequent incident, emerging and collimated branches are formed and finally the last collimated branch $56_4''$ strikes an end mirror $90_2$ in the space segment $32_{22}$, which corresponds to the end mirror 90 of the fifth exemplary embodiment and which makes the pump radiation field 20 that passes once through the two focusing subsystems $30_1$ and $30_2$ run back again in a reverse fashion.

In the sixth exemplary embodiment, 16 pump transmissions are therefore obtained overall in each of the two solid bodies $10_1$ and $10_2$.

As an alternative to providing the deviating prism 102, it is also conceivable to provide deviating and intermediate-focusing optics in the deviating unit, so that the optical path between the focusing subsystems $30_1$ and $30_2$ can be selected in an arbitrary way.

Figure 18:
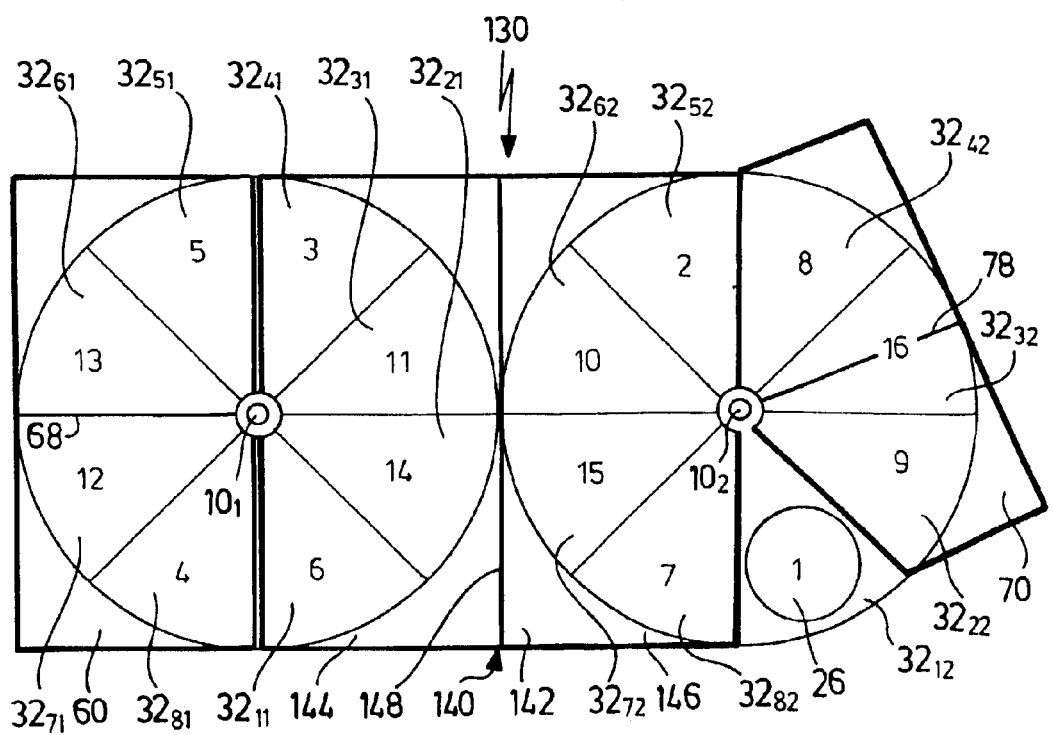
FIG. 18 a similar representation to FIG. 12 in the case of a seventh exemplary embodiment.

In a seventh exemplary embodiment of a laser amplifier system according to the invention, represented in FIG. 18, the pumping of two solid bodies $10_1$ and $10_2$ likewise takes place via a focusing system 130 which, as in the first exemplary embodiment, has the deviating units 60 and 70, the deviating unit 60 being allocated to the first solid body $10_1$ and the deviating unit 70 being allocated to the second solid body $10_2$ and, between these deviating units 70, a deviating unit 140 denoted as a whole by 140 being provided, which comprises a prism 142 with two reflection faces 144 and 146 that are arranged symmetrically with respect to a symmetry plane 148, the symmetry plane 148 stretching between the solid bodies 10 and transversely with respect to a connecting straight line between them.

The reflection face 144 is in this case allocated to the space segments $32_{11}$ to $32_{41}$, and it is used to couple the space segments $32_{11}$ to $32_{41}$ together with the space segments $32_{52}$ to $32_{82}$, a reflection respectively taking place symmetrically with respect to the symmetry plane 148 which runs perpendicularly to the symmetry plane 68.

Preferably, the deviating unit 140 couples the space segments $32_{52}$ and $32_{41}$ as well as $32_{31}$ and $32_{62}$, $32_{21}$ and $32_{72}$ as well as $32_{82}$ and $32_{11}$.

A collimated pump branch 26 delivered in the space segment $32_{12}$ is hence transferred via an incident and emerging branch into the space segment $32_{52}$, there from the as a collimated branch by the deviating unit 140 into the space segment $32_{41}$ from the space segment $32_{41}$ via an incident and emerging branch into the space segment $32_{81}$, deviated from the space segment $32_{81}$ via the deviating unit 60 into the space segment $32_{51}$, from the space segment $32_{51}$ via an incident and emerging branch into the space segment $32_{11}$, from the space segment $32_{11}$ into the space segment $32_{82}$, from the space segment $32_{82}$ via an incident and emerging branch into the space segment $32_{42}$, deviated from the space segment $32_{42}$ by the deviating unit 70 into the space segment $32_{22}$, deviated from the space segment $32_{22}$ via an incident and emerging branch into the space segment $32_{62}$, projected from the space segment $32_{62}$ into the space segment $32_{31}$ by the deviating unit 140, from the space segment $32_{31}$ via an incident and emerging branch into the space segment $32_{71}$, deviated from the space segment $32_{71}$ by the deviating unit 60 into the space segment $32_{51}$, deviated from the space segment $32_{51}$ via an incident and emerging branch into the space segment $32_{21}$, deviated from the space segment $32_{21}$ by the deviating unit 140 into the space segment $32_{72}$ and from the space segment $32_{72}$ via an incident and emerging branch into the space segment $32_{32}$ and reflected back on itself there laterally inverted by the deviating unit 70 in the same way as in the first exemplary embodiment, so that after the first transmission, the pump radiation field 20 again passes through the focusing system 130 with a second transmission, and therefore respectively produces sixteen pump transmissions in each of the solid bodies $10_1$ and $10_2$.

What is claimed is:

1. A laser amplifier system comprising:
   a solid body having a laser-active medium,
   a pump radiation source for producing a pump radiation field which passes multiple times through the solid body in order to provide optical pumping of said laser active medium, and
   a focusing system which receives the pump radiation field exiting from the pump radiation source and produces a plurality of different branches of the pump radiation field that enter the solid body, and which converts at least one branch that emerges from the solid body into one of the branches that enter the solid body with trajectories different from the trajectory of the emerging branch,
   the focusing system comprising at least one deviating unit which, by radiation field deviation relative to a single symmetry plane, converts at least two first sub-branches, formed from at least two different branches of the pump radiation field that emerge from the solid body, into at least two corresponding second sub-branches with trajectories locally separate from the first sub-branches, from which at least two branches that enter the solid body are obtained.

2. A laser amplifier system in accordance with claim 1, wherein:
   the focusing system comprising a further deviating unit which converts at least one first sub-branch, formed from an emerging branch, into a second sub-branch with a trajectory locally different from the first sub-branch, one of the incident branches being obtained from said second sub-branch and said incident branch leads to an emerging branch from which a first sub-branch that strikes the at least one deviating unite is obtained.

3. A laser amplifier system comprising:
   a solid body having a laser-active medium,
   a pump radiation source for producing a pump radiation field which passes multiple times through the solid body in order to provide optical pumping of said laser active medium, and
   a focusing system which receives the pump radiation field exiting from the pump radiation source and produces a plurality of different branches of the pump radiation field that enter the solid body, and which converts at least one branch that emerges from the solid body into one of the branches that enter the solid body with trajectories different from the trajectory of the emerging branch,
   the focusing system comprising a first deviating unit and a second deviating unit, the two deviating units, respectively by radiation field deviation relative to a single symmetry plane, converting overall at least three first sub-branches, formed from at least three different emerging branches of the pump radiation field, into at least three corresponding second sub-branches with trajectories locally separate from the first sub-branches, from which at least three incident branches are obtained.

4. A laser amplifier system comprising:
   a solid body having a laser-active medium,
   a pump radiation source for producing a pump radiation field which passes multiple times through the solid body in order to provide optical pumping of said laser active medium, and
   a focusing system which receives the pump radiation field exiting from the pump radiation source and produces a plurality of different branches of the pump radiation field that enter the solid body, and which converts at least one branch that emerges from the solid body into one of the branches that enter the solid body with trajectories different from the trajectory of the emerging branch,
   the focusing system comprising at least one deviating unit, and the deviating unit forming, from one of the first sub-branches, a second sub-branch which is offset in relation to a mid-axis of the focusing system by an angular spacing such that at least one further first sub-branch lies in the angle range between this first sub-branch and the second sub-branch formed therefrom.

5. A laser amplifier system comprising:
   a solid body having a laser-active medium,
   a pump radiation source for producing a pump radiation field which passes multiple times through the solid body in order to provide optical pumping of said laser active medium, and
   a focusing system which receives the pump radiation field exiting from the pump radiation source and produces a plurality of different branches of the pump radiation field that enter the solid body, and which converts at least one branch that emerges from the solid body into one of the branches that enter the solid body with trajectories different from the trajectory of the emerging branch,
   the focusing system comprising a first deviating unit, which deviates the pump radiation field relative to a first symmetry plane, and a second deviating unit, which deviates the pump radiation field relative to a second symmetry plane, and the symmetry planes meeting at an angle which corresponds to 180° or 360° divided by the sum of the incident and emerging branches arising during a pass of the pump radiation field through the focusing system and the solid body.

6. The laser amplifier system as claimed in claim 1, wherein the symmetry plane runs parallel to the mid-axis.

7. The laser amplifier system as claimed in claim 5, wherein the symmetry planes run through the mid-axis.

8. The laser amplifier system as claimed in claim 1, wherein the first sub-branches have separate trajectories from one another in the pump radiation field.

9. The laser amplifier system as claimed in claim 8, wherein the first sub-branches are arranged relative to one another at angular spacings around a mid-axis of the focusing system.

10. The laser amplifier system as claimed in claim 1, wherein the second sub-branches have separate trajectories from one another.

11. The laser amplifier system as claimed in claim 8, wherein the second sub-branches have separate trajectories from the first sub-branches.

12. The laser amplifier system as claimed in claim 10, wherein the second sub-branches are arranged relative to one another, and relative to the first sub-branches, at angular spacings around the mid-axis of the focusing system.

13. The laser amplifier system as claimed in claim 3, wherein the at least three first sub-branches and the at least three second sub-branches arise during a pass of the pump radiation field through the focusing system and the solid body.

14. The laser amplifier system as claimed in claim 1, wherein the first and second sub-branches arising during a pass of the pump radiation field through the focusing system are arranged without overlap in the space around the mid-axis of the focusing system.

15. The laser amplifier system as claimed in claim 13, wherein the first and second sub-branches and the pump radiation branch of a pass are arranged without overlap in the space around the mid-axis of the focusing system.

16. The laser amplifier system as claimed in claim 1, wherein the first and second sub-branches are respectively arranged in space segments around the mid-axis of the focusing system, and extend inside the space segments transversely with respect to their propagation direction.

17. The laser amplifier system as claimed in claim 15, wherein each of the space segments stretches over approximately the same angle range around the mid-axis.

18. The laser amplifier system as claimed in claim 16, wherein the space segments of the first and second sub-branches, as well as the space segment of the pump radiation branch, substantially enclose the mid-axis.

19. The laser amplifier system as claimed in claim 1, wherein the focusing system converts a branch that emerges from the solid body into an intermediate-collimated branch, and converts the intermediate-collimated branch in turn into a branch that again enters the solid body and is focused onto it.

20. The laser amplifier system as claimed in claim 19, wherein the intermediate-collimated branches form the first and second sub-branches.

21. The laser amplifier system as claimed in claim 19, wherein the focusing system has collimating and focusing elements which convert the emerging branches into intermediate-collimated branches and the intermediate-collimated branches into incident branches, respectively.

22. The laser amplifier system as claimed in claim 20, wherein the deviating units deviate the intermediate-collimated branches.

23. The laser amplifier system as claimed in claim 1, wherein a collimated first sub-branch formed after a pass through the focusing system is converted into a second sub-branch that is substantially congruent with the first sub-branch.

24. The laser amplifier system as claimed in claim 23, wherein the second sub-branch that is substantially congruent with the first sub-branch is obtained by back-reflection at a plane reflection surface.

25. The laser amplifier system as claimed in claim 23, wherein the second sub-branch that is substantially congruent with the first sub-branch occurs by reflection at a symmetry-preserving deflecting reflection system.

26. The laser amplifier system as claimed in claim 1, wherein the focusing system has at most two deviating units allocated to the solid body, which convert a first sub-branch, formed from a branch that emerges from the solid body, into a second sub-branch which forms one of the branches that enter this solid body.

27. The laser amplifier system as claimed in claim 1, wherein it comprises at least two solid bodies, and in that at least a third deviating unit is provided which deviates a branch of the pump radiation field transversely with respect to a further symmetry plane stretching between the solid bodies.

28. The laser amplifier system as claimed in claim 1, wherein the deviating unit comprises two reflection faces running at an angle to one another.

29. The laser amplifier system as claimed in claim 28, wherein the reflection faces are arranged on a reflector unit.

30. The laser amplifier system as claimed in claim 29, wherein the reflector unit is a prism.

31. The laser amplifier system as claimed in claim 1, wherein the deviating units form a recess through which the branches that enter or emerge from the solid body pass.

32. The laser amplifier system as claimed in claim 1, wherein the deviating units form a recess through which a pump radiation branch enters the focusing system.

* * * * *